(12) United States Patent
Matsushita

(10) Patent No.: US 11,056,283 B2
(45) Date of Patent: Jul. 6, 2021

(54) MULTILAYER CERAMIC CAPACITOR AND MANUFACTURING METHOD OF THE SAME

(71) Applicant: TAIYO YUDEN CO., LTD., Tokyo (JP)

(72) Inventor: Yuji Matsushita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 50 days.

(21) Appl. No.: 16/379,545

(22) Filed: Apr. 9, 2019

(65) Prior Publication Data

US 2019/0318876 A1 Oct. 17, 2019

(30) Foreign Application Priority Data

Apr. 11, 2018 (JP) .............................. JP2018-075984

(51) Int. Cl.
| | |
|---|---|
| *H01G 4/30* | (2006.01) |
| *H01G 4/228* | (2006.01) |
| *H01G 4/12* | (2006.01) |
| *H01G 4/012* | (2006.01) |

(52) U.S. Cl.
CPC .............. *H01G 4/30* (2013.01); *H01G 4/012* (2013.01); *H01G 4/12* (2013.01); *H01G 4/228* (2013.01)

(58) Field of Classification Search
CPC ........... H01G 4/30; H01G 4/012; H01G 4/12; H01G 4/1227; H01G 4/2325; H01G 4/1209; H01G 4/228; H01G 4/306
See application file for complete search history.

(56) References Cited

U.S. PATENT DOCUMENTS

2019/0148074 A1* 5/2019 Terashita ................. H01G 4/30
361/321.2

FOREIGN PATENT DOCUMENTS

JP 2005101470 A 4/2005

* cited by examiner

*Primary Examiner* — Michael P McFadden
(74) *Attorney, Agent, or Firm* — Law Office of Katsuhiro Arai

(57) ABSTRACT

A multilayer ceramic capacitor includes: a ceramic main body having a structure in which each of a plurality of dielectric layers and each of a plurality of internal electrode layers are alternately stacked and are alternately exposed to two end faces of the ceramic multilayer structure, a main component of the dielectric layers being ceramic; and a pair of external electrodes that are formed from the two end faces to at least one of side faces of the ceramic main body, wherein a relationship of $y \leq 1+1.48x$ is satisfied when a temperature of the multilayer ceramic capacitor is increased from 190 degrees C. to 260 degrees C., wherein "y" is a total amount of hydrogen gas, water vapor and carbonic acid gas (number of molecules/$10^{15}$) released from the multilayer ceramic capacitor, wherein a volume of the multilayer ceramic capacitor is "x" (mm$^3$).

11 Claims, 7 Drawing Sheets

ZOOMED

MULTILAYER CERAMIC CAPACITOR AND MANUFACTURING METHOD OF THE SAME

CROSS-REFERENCE TO RELATED APPLICATION

This application is based upon and claims the benefit of priority of the prior Japanese Patent Application No. 2018-075984, filed on Apr. 11, 2018, the entire contents of which are incorporated herein by reference.

FIELD

A certain aspect of the present invention relates to a multilayer ceramic capacitor and a manufacturing method of the same.

BACKGROUND

There is known a multilayer ceramic capacitor having a ceramic main body and a pair of external electrode layers, the multilayer ceramic capacitor having a structure in which each of a plurality of dielectric layers and each of a plurality of internal electrode layers are alternately stacked and the plurality of internal electrodes are alternately exposed to two facing end faces, the pair of external electrodes being provided on the two end faces (for example, see Japanese Patent Application Publication No. 2005-101470).

SUMMARY OF THE INVENTION

The multilayer ceramic capacitor is mounted on a substrate or the like by a reflow process. In this case, solder burst may occur because of gas released from the multilayer ceramic capacitor.

The present invention has a purpose of providing a multilayer ceramic capacitor and a manufacturing method of a multilayer ceramic capacitor that are capable of suppressing solder burst.

According to an aspect of the present invention, there is provided a multilayer ceramic capacitor including: a ceramic main body having a structure in which each of a plurality of dielectric layers and each of a plurality of internal electrode layers are alternately stacked and are alternately exposed to two end faces of the ceramic multilayer structure, a main component of the dielectric layers being ceramic; and a pair of external electrodes that are formed from the two end faces to at least one of side faces of the ceramic main body, wherein a relationship of $y \leq 1+1.48x$ is satisfied when a temperature of the multilayer ceramic capacitor is increased from 190 degrees C. to 260 degrees C., wherein "y" is a total amount of hydrogen gas, water vapor and carbonic acid gas (number of molecules/$10^{15}$) released from the multilayer ceramic capacitor, wherein "x" (mm$^3$) is a volume of the multilayer ceramic capacitor.

According to another aspect of the present invention, there is provided a manufacturing method of a multilayer ceramic capacitor including: preparing a multilayer ceramic capacitor having a ceramic main body and a pair of external electrodes, the ceramic main body having a structure in which each of a plurality of dielectric layers and each of a plurality of internal electrode layers are alternately stacked and are alternately exposed to two end faces of the ceramic multilayer structure, a main component of the dielectric layers being ceramic, the pair of external electrodes being formed from the two end faces to at least one of side faces of the ceramic main body, heating the multilayer ceramic capacitor in a reduced pressure atmosphere so that a relationship $y \leq 1+1.48x$ is satisfied when a temperature of the multilayer ceramic capacitor is increased from 190 degrees C. to 260 degrees C., wherein "x" (mm$^3$) is a volume of the multilayer ceramic capacitor, wherein "y" is a total amount of hydrogen gas, water vapor and carbonic acid gas (number of molecules/$10^{15}$) released from the multilayer ceramic capacitor.

DETAILED DESCRIPTION

A description will be given of an embodiment with reference to the accompanying drawings.

Embodiment

Figure 1:
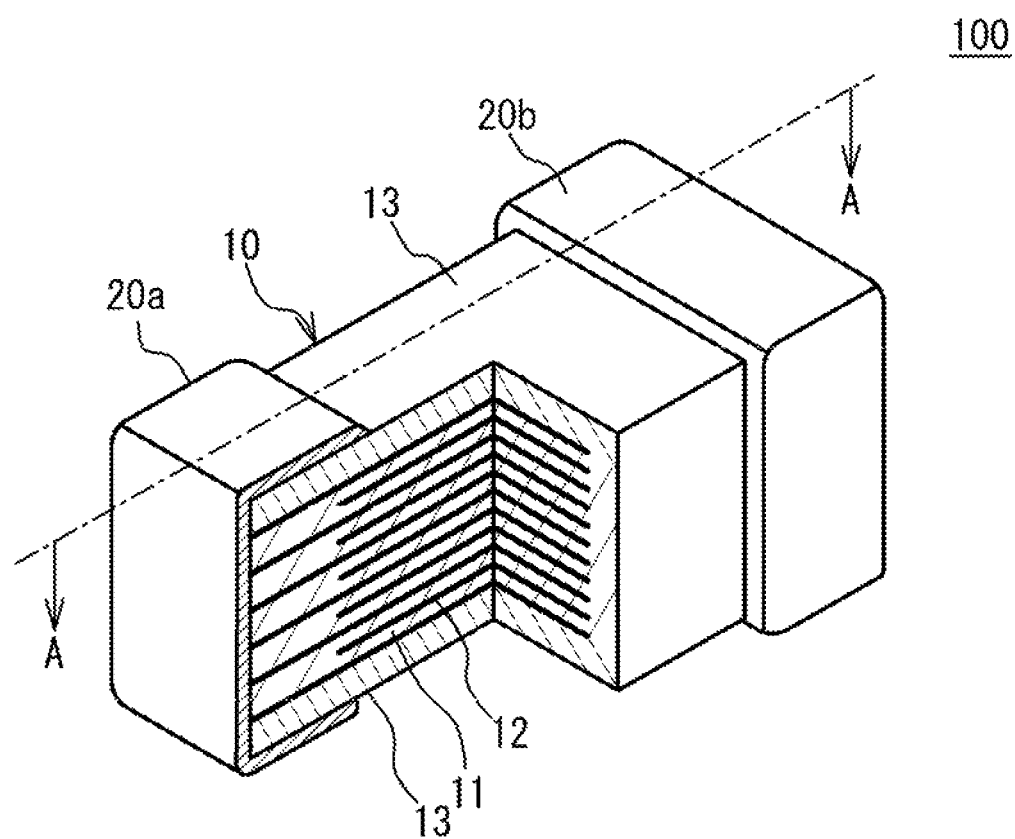
FIG. 1 illustrates a partial perspective view of a multilayer ceramic capacitor.

FIG. 1 illustrates a partial perspective view of a multilayer ceramic capacitor 100 in accordance with an embodiment. As illustrated in FIG. 1, the multilayer ceramic capacitor 100 includes a ceramic main body 10 having a rectangular parallelepiped shape, and a pair of external electrodes 20a and 20b that are respectively provided at two end faces of the ceramic main body 10 facing each other. In four faces other than the two end faces of the ceramic main body 10, two faces other than an upper face and a lower face of the ceramic main body 10 in a stacking direction are referred to as side faces. The external electrodes 20a and 20b extend to the upper face, the lower face and the two side faces. However, the external electrodes 20a and 20b are spaced from each other.

The ceramic main body 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first end face of the ceramic main body 10 and a second end face of the ceramic main body 10 that is different from the first end face. In the embodiment, the first face faces with the second face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in the stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 1.6 mm, a width of 0.8 mm and a height of 0.8 mm. The multilayer ceramic capacitor 100 may have a length of 2.0 mm, a width of 1.25 mm and a height of 1.25 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited. In the following, a volume of the multilayer ceramic capacitor 100 is calculated with use of sizes that are standards of these normalized sizes. In the following, size tolerance is not considered.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material of which a main phase is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
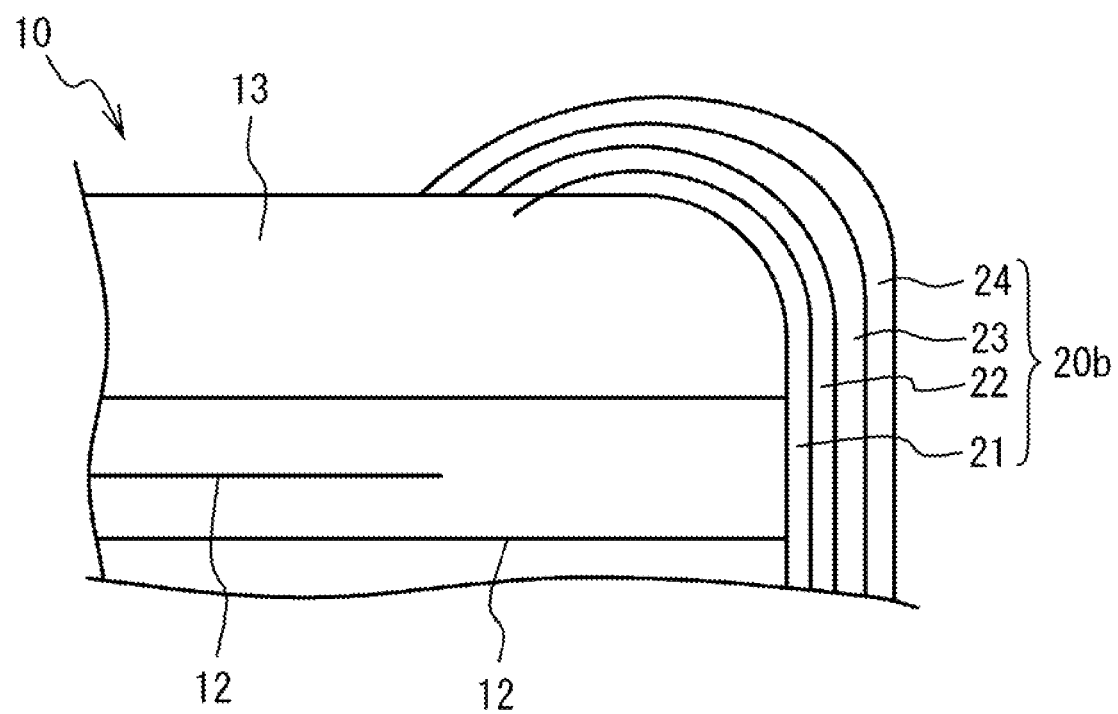
FIG. 2 illustrates a cross sectional view of an external electrode and a partial cross section taken along a line A-A of FIG. 1.

FIG. 2 illustrates a cross sectional view of the external electrode 20b. FIG. 2 illustrates a partial cross sectional view taken along a line A-A of FIG. 1. In the cross section of FIG. 2, hatch is omitted. As illustrated in FIG. 2, the external electrode 20b has a structure in which a Cu-plated layer 22, a Ni-plated layer 23 and a Sn-plated layer 24 are formed on a base layer 21. The base layer 21, the Cu-plated layer 22, the Ni-plated layer 23 and the Sn-plated layer 24 extend from the both end faces of the ceramic main body 10 toward the four side faces. In FIG. 2, the external electrode 20b is illustrated. The external electrode 20a has the same structure as the external electrode 20b.

A main component of the base layer 21 is a metal such as Ni or Cu, or an alloy. The base layer 21 may include a glass component for densifying the base layer 21 or a co-material for controlling the sintering characteristic of the base layer 21. The glass component is oxide of Ba, Sr, Ca, Zn (zinc), Al (aluminum), Si (silicon), B (boon) or the like. The co-material is a ceramic component of which a main component is the same as the main component of the dielectric layer 11.

The multilayer ceramic capacitor 100 is mounted on a substrate or the like by a reflow process. In the reflow process, water bled from the multilayer ceramic capacitor 100, crystal water such as Ni, or the like is released as gas. The gas may contact with melted solder. And the solder burst may occur. This means that when an amount of the gas released from the multilayer ceramic capacitor 100 is sufficiently small, the solder burst can be suppressed. And so, the embodiment focuses on the amount of the gas released during heating of the multilayer ceramic capacitor 100.

The gas released from the multilayer ceramic capacitor 100 is mainly hydrogen ($H_2$) gas, water vapor ($H_2$) and carbonic acid gas (CO, $CO_2$). The gas may cause the solder burst. Therefore, the embodiment focuses on a total released gas amount of the hydrogen gas, the water vapor gas and the carbonic acid gas.

Figure 3:
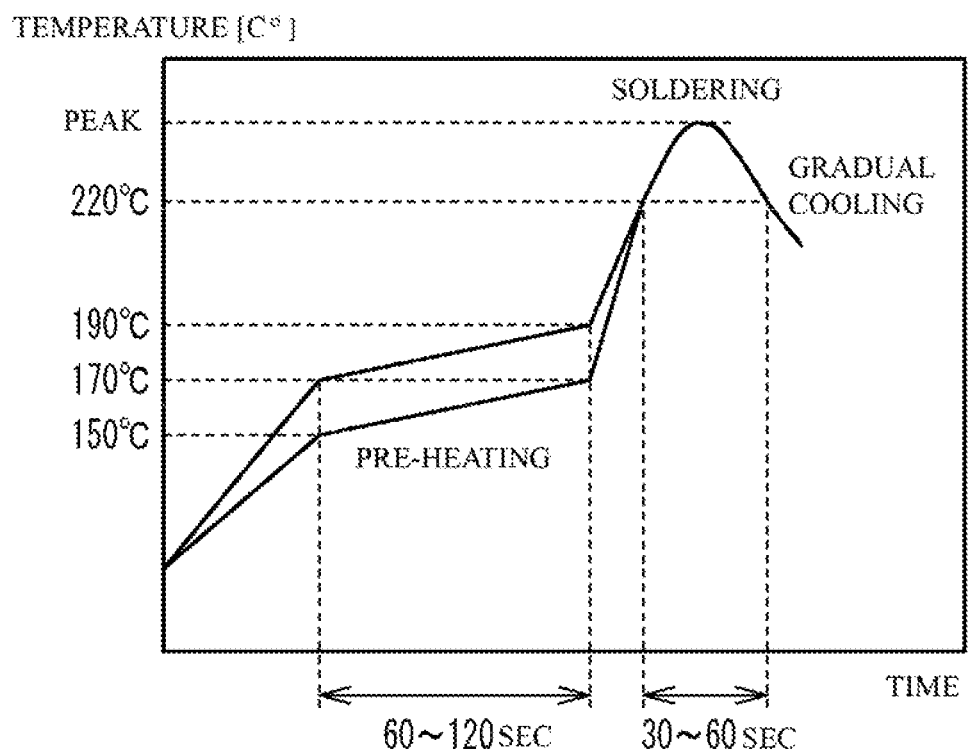
FIG. 3 illustrates a standard condition of a reflow process.

FIG. 3 illustrates a standard condition of the reflow process. As illustrated in FIG. 3, the reflow process includes a pre-heating process and a soldering process. In the pre-heating process, the multilayer ceramic capacitor 100 is heated, and a temperature of the multilayer ceramic capacitor 100 is increased to 190 degrees C. In the soldering process, the multilayer ceramic capacitor 100 is further heated, and the temperature of the multilayer ceramic capacitor 100 is increased from 190 degrees C. to a peak temperature of approximately 260 degrees C. After the soldering process, the multilayer ceramic capacitor 100 is gradually cooled down. In the pre-heating process, a gas component such as the water vapor is released from the multilayer ceramic capacitor 100. For example, a water component adsorbed to the multilayer ceramic capacitor 100 is released as the gas component. However, in the pre-heating process, the water component may be left inside of the multilayer ceramic capacitor 100. The left water component is not released as the gas component, in the pre-heating process. And, unless the temperature of the multilayer ceramic capacitor 100 is increased to a higher temperature in the soldering process, the left water component tends to be left in the multilayer ceramic capacitor 100. The gas component causing the solder burst is released in the soldering process. Therefore, it is requested that the amount of the gas component released in the soldering process is small. And so, in the embodiment, a gas amount released in a case where the temperature of the multilayer ceramic capacitor 100 is increased from 190 degrees C. to 260 degrees C. is adjusted so as not to exceed a threshold.

When the multilayer ceramic capacitor 100 is large, the amount of the solder is large. Therefore, in this case, even if an absolute amount of the released gas is large, influence of the released gas on the solder is relatively small. On the other hand, when the multilayer ceramic capacitor 100 is small, the amount of the solder is small. Therefore, in this case, even if the absolute amount of the released gas is small, the influence of the released gas on the solder is relatively large. And so, in the embodiment, the volume of the multilayer ceramic capacitor 100 influences on the threshold. As a result of the study of the present inventor, a relationship of $y \leq 1 + 1.48x$ is satisfied when the temperature of the multilayer ceramic capacitor 100 is increased from 190 degrees C. to 260 degrees C. "y" is an amount of the released gas (number of molecules/$10^{15}$). "x" is the volume ($mm^3$) of the multilayer ceramic capacitor 100. In this manner, when the total amount "y" of the released gas is regulated, the amount of the released gas is sufficiently suppressed. It is therefore possible to suppress the solder burst.

A large amount of the water component tends to be left in the plated layers. Therefore, the embodiment has a specifically large effect on multilayer ceramic capacitors having a plated layer. Crystal water tends to be left in the Ni-plated layer. Therefore, the embodiment has a specifically large effect on multilayer ceramic capacitors having a Ni-plated layer. It is presumed that a large amount of the hydrogen gas tends to be left in the Ni-plated layer, the Ni base layer, the Ni internal electrode layer and so on. Therefore, the embodiment has a specifically large effect on multilayer ceramic capacitors having the Ni-plated layer, the Ni-base layer, the Ni internal electrode layer and so on. It is thought that the binder included in conductive paste to be the base layer of the external electrode or the slurry to be the dielectric layers causes the carbonic acid gas. Therefore, a large amount of the carbonic acid gas tends to be left in the base layer, the dielectric layer and so on. Therefore, the embodiment has a specifically large effect when the conductive paste including the binder and the slurry including the binder are fired.

Figure 4:
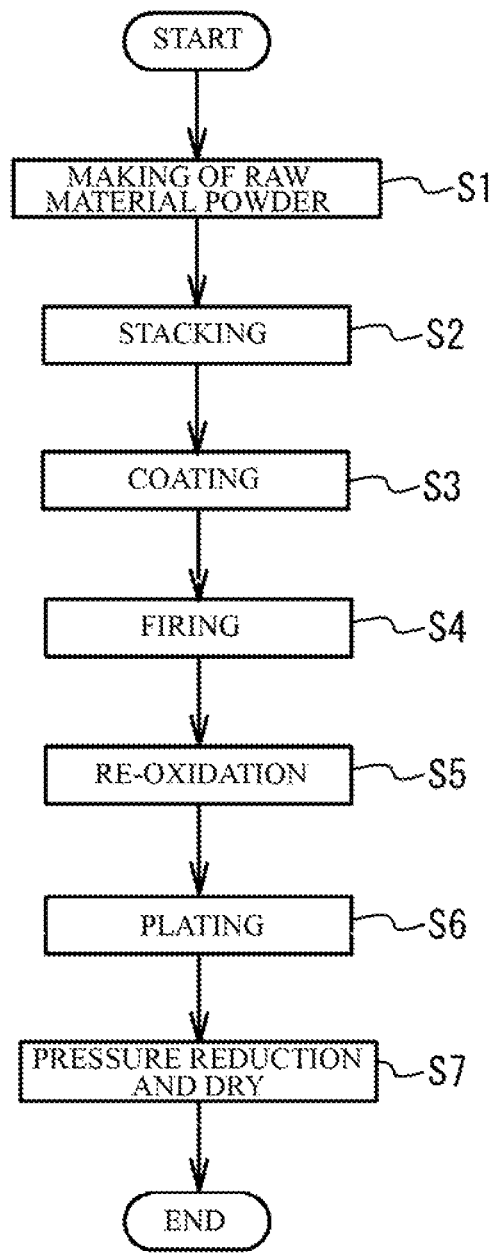
FIG. 4 illustrates a manufacturing method of a multilayer ceramic capacitor.

Next, a description will be given of a manufacturing method of the multilayer ceramic capacitor 100. FIG. 4 illustrates a manufacturing method of the multilayer ceramic capacitor 100.

(Making Process of Raw Material Powder)

A dielectric material for forming the dielectric layer 11 is prepared. Generally, an A site element and a B site element are included in the dielectric layer 11 in a sintered phase of grains of $BaTiO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used.

Additive compound may be added to the resulting ceramic powder, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B, Na (sodium), K (potassium) and Si, or glass.

In the embodiment, compound including additive compound is mixed with the ceramic material powder. The resulting ceramic material powder with the additive compound is calcined within a temperature range of 820 degrees C. to 1150 degrees C. Then, the ceramic material powder is wet-blended with the additive compound. After that, the ceramic material powder with the additive compound is dried and crushed. And, desirable ceramic material is prepared. For example, the grain diameter of the resulting ceramic material may be adjusted by crushing the resulting ceramic material. Alternatively, the grain diameter may be adjusted by performing the crushing and a classifying process. With the processes, the ceramic material acting as the main component of the dielectric layer 11 is obtained.

(Stacking Process)

Next, a binder such as polyvinyl butyral (PVB) resin, an organic solvent such as ethanol or toluene, and a plasticizer are added to the resulting ceramic material and wet-blended. With use of the resulting slurry, a green sheet with a thickness of 1.0 μm or less is formed by, for example, a die coater method or a doctor blade method. Alternately, a green sheet having a desirable thickness may be formed by stacking a plurality of thin green sheets.

Then, a pattern of the internal electrode layer 12 is provided on the surface of the green sheet by printing metal conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, $BaTiO_3$ of which an average grain diameter is 50 nm or less may be evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are compressed on the stacked dielectric green sheets and under the stacked dielectric green sheets. The resulting multilayer structure is cut into a predetermined size.

(Coating Process)

The binder is removed from the resulting ceramic multilayer structure in $N_2$ atmosphere. After that, conductive paste for the external electrode including metal filler including the main component metal of the base layer 21, a co-material, a binder, a solvent and so on is coated from the both end faces of the ceramic multilayer structure to the side faces and is dried.

(Firing Process)

Next, after removing the binder in $N_2$ atmosphere at 250 degrees C. to 500 degrees C., the resulting compact is fired for ten minutes to 2 hours in a reductive atmosphere, of which an oxygen partial pressure is $10^{-10}$ to $10^{12}$ atm, in a temperature range of 1100 degrees C. to 1300 degrees C. Thus, each compound is sintered and grains of each compound grow.

(Re-Oxidizing Process)

After that, a re-oxidizing process may be performed at 600 degrees C. to 1000 degrees C. in $N_2$ gas atmosphere.

(Plating Process)

After that, the Cu-plated layer 22, the Ni-plated layer 23 and the Sn-plated layer 24 are formed on the base layer 21 formed on the two end faces of the sintered structure. Thus, the multilayer ceramic capacitor 100 is obtained.

(Pressure Reduction and Dry Process)

After the plating process, the gas component is released from the multilayer ceramic capacitor 100 by reducing the pressure of the atmosphere around the multilayer ceramic capacitor 100 and drying the multilayer ceramic capacitor 100. For example, when the amount of the released gas is small, only the pressure reduction and dry process may be performed. Alternatively, after the atmosphere is replaced by dried air, $N_2$ (nitrogen), or Ar (argon), the pressure of the atmosphere may be reduced. As shown in Table 1, a thermal conductivity of He (helium) is five times or more of the thermal conductivities of the air, $N_2$ and Ar. Therefore, when the amount of the released gas is large, it is preferable that the pressure of the atmosphere is reduced after the atmosphere is replaced by helium.

| TEMPERATURE | THERMAL CONDUCTIVITY [W/m · K] | | | |
|---|---|---|---|---|
| [° C.] | AIR | ARGON | NITROGEN | HELIUM |
| 100 | 0.0316 | 0.0211 | 0.0313 | 0.1663 |

Figure 5:
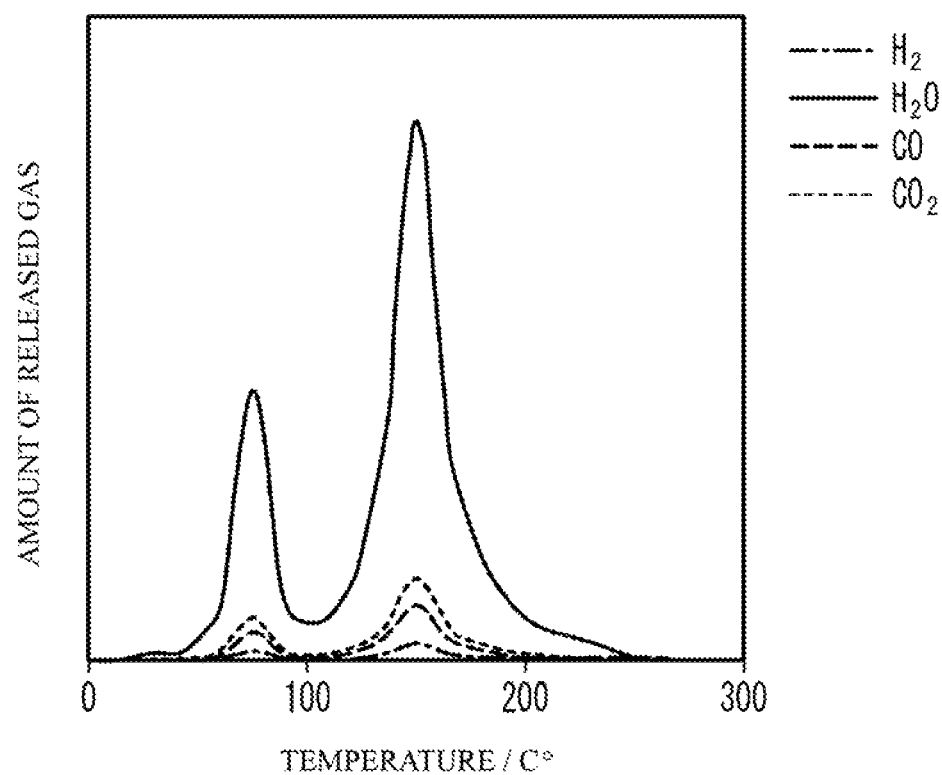
FIG. 5 illustrates a relationship between a temperature of a heated multilayer ceramic capacitor and an amount of released gas.

Next, the multilayer ceramic capacitor 100 is heated. Here, a description is given of a relationship between the temperature of the heated multilayer ceramic capacitor 100 and the amount of the released gas. FIG. 5 illustrates the relationship between the temperature of the heated multilayer ceramic capacitor 100 and the amount of the released gas. As illustrated in FIG. 5, a first peak appears in the amount of the released gas until approximately 100 degrees C. It is thought that the first peak indicates the gas component adsorbed to the multilayer ceramic capacitor 100. Therefore, even if the temperature of the multilayer ceramic capacitor 100 is increased to approximately 100 degrees C., the gas component left inside of the multilayer ceramic capacitor 100 may not be necessarily removed. And so, the temperature is increased to 120 degrees C. or more. As illustrated in FIG. 5, a second peak appears in the amount of the released gas until approximately 200 degrees C. It is thought that the second peak mainly indicates the gas component left inside of the multilayer ceramic capacitor 100. Therefore, it is preferable that the temperature of the multilayer ceramic capacitor 100 is increased to approximately 200 degrees C. However, the melting point of Sn is 232 degrees C. Therefore, when the temperature of the multilayer ceramic capacitor 100 is increased to more than 230 degrees C., the Sn-plated layer may be melted or quality of the Sn-plated layer may be changed. And so, in the embodiment, in the pressure reduction and dry process, the temperature of the multilayer ceramic capacitor 100 is increased to 120 degrees C. or more and 230 degrees C. or less. However, for a time less than 15 minutes, a sufficient amount of the gas inside of the multilayer ceramic capacitor 100 may not be necessarily removed. And so, the temperature of the multilayer ceramic capacitor 100 is kept to 120 degrees C. or more and 230 degrees C. or less for 15 minutes or more.

In the pressure reduction and dry process, the released gas is monitored by a quadrupole type mass spectrometer. And it is confirmed that the total amount "y" of the released gas is (1+1.48x) or less. It is possible to confirm the type of the gas, the temperature at which the gas is released, in advance, by a heat generated gas analysis (TDS, Py-GC/MS, TPD or the like). On the basis of the function of the confirmed gas releasing, the drying temperature and the amount of the released gas per a unit time acting as a termination standard are set to the drying condition.

(Lapping Process)

After that, the multilayer ceramic capacitor 100 is lapped by a tape. With the processes, the multilayer ceramic capacitor 100 is manufactured.

In the manufacturing method of the multilayer ceramic capacitor, the pressure reduction and dry process is performed so that the relationship y≤1+1.48x is satisfied when the temperature of the multilayer ceramic capacitor 100 is increased from 190 degrees C. to 260 degrees C. When the total amount of the released gas is regulated in this manner, the amount of the released gas is small. It is therefore possible to suppress the solder burst.

A large amount of the water component tends to be left in the plated layers. Therefore, the embodiment has a specifically large effect on multilayer ceramic capacitors having a plated layer. Crystal water tends to be left in the Ni-plated layer. Therefore, the embodiment has a specifically large effect on multilayer ceramic capacitors having a Ni-plated layer. It is presumed that a large amount of the hydrogen gas tends to be left in the Ni-plated layer, the Ni base layer, the Ni internal electrode layer and so on. Therefore, the embodiment has a specifically large effect on multilayer ceramic capacitors having the Ni-plated layer, the Ni-base layer, the Ni internal electrode layer and so on. It is thought that the binder included in conductive paste to be the base layer of the external electrode or the slurry to be the dielectric layers causes the carbonic acid gas. Therefore, a large amount of the carbonic acid gas tends to be left in the base layer, the dielectric layer and so on. Therefore, the embodiment has a specifically large effect when the conductive paste including the binder and the slurry including the binder are fired.

Figure 6:
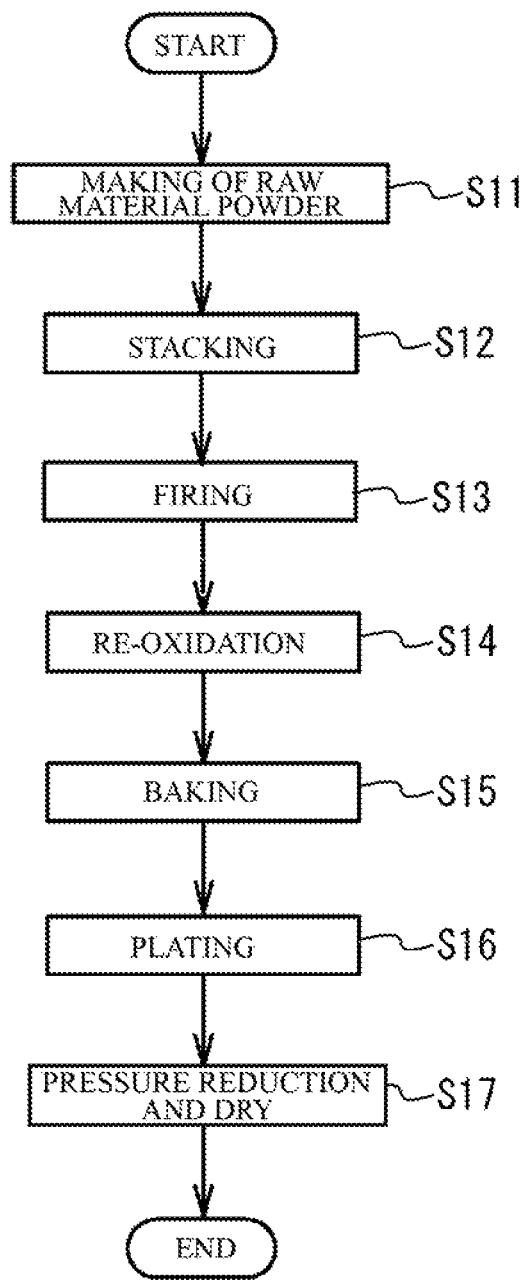
FIG. 6 illustrates another manufacturing method of a multilayer ceramic capacitor.

FIG. 6 illustrates another manufacturing method of the multilayer ceramic capacitor 100. The manufacturing method of FIG. 6 is different from the manufacturing method of FIG. 4 in a point that the coating process is not performed, and the plating process is performed after a baking process after the re-oxidizing process. A description will be given of the baking process.

(Baking Process)

Conductive paste for the external electrode including a metal filler including the main component metal of the base layer 21, a glass component, a binder and a solvent is coated on the both end faces of the ceramic main body 10 after the re-oxidation process, and is dried. After that, the conductive paste is baked. Thus, the base layer 21 is formed. In the method, it is preferable that the metal filler is Cu or the like. It is preferable that the baking is performed for 3 minutes to 30 minutes in a temperature range of 700 degrees C. to 900 degrees C. It is more preferable that the baking is performed for 5 minutes to 15 minutes in a temperature range of 760 degrees C. to 840 degrees C.

EXAMPLES

The multilayer ceramic capacitors in accordance with the embodiment were made and the property was measured.

Examples 1 to 4

Necessary additive was added to barium titanate powder and were wet-blended with the resulting barium titanate powder, and were sufficiently crushed by a ball mill. Thus, the dielectric material was obtained. An organic binder and a solvent were added to the dielectric material. A dielectric green sheet was formed by a doctor blade method. Polyvinyl butyral (PVB) or the like was used as the organic binder. Ethyl alcohol, toluene or the like was added as the solvent. In addition, plasticizer or the like was added. Next, the conductive paste for the internal electrode including the powder of the main component metal (Ni) of the internal electrode layer 12, the co-material (barium titanate), the binder (ethyl cellulose), the solvent and the necessary additive was made.

Conductive paste for an internal electrode was screen-printed on the resulting dielectric sheet. Thus, the sheet on which the pattern was formed was made. The sheet on which the pattern was formed was peeled from the base material. And a plurality of the sheets are stacked. Cover sheets including the dielectric material were stacked on a lower face and an upper face of the stacked sheets. After that, a ceramic multilayer structure was obtained by a thermo compression bonding. And the resulting multilayer structure was cut into a predetermined shape.

After removing the binder in $N_2$ atmosphere in a temperature range from 250 degrees C. to 500 degrees C., the conductive paste for the external electrode including the metal filler of which a main component was Ni, the co-material, the binder, the solvent and so on was coated from the both end faces of the ceramic multilayer structure to the side faces and was dried. After that, a compact on which the conductive paste for the external electrode was fired in a temperature range from 1100 degrees C. to 1300 degrees C. in a reductive atmosphere ($O_2$ partial pressure: $10^{-10}$ to $10^{-12}$ atm). And sintered multilayer structure was formed. After that, a Cu-plated layer, a Ni-plated layer, and a Sn-plated layer were formed on a base layer by the plating process. The base layer was formed by the firing of the conductive paste for the external electrode. Thus, samples of the multilayer ceramic capacitor were made.

After that, the atmosphere was replaced by dried air, and the pressure of the atmosphere was reduced. After that, the temperature of the multilayer ceramic capacitor 100 was increased to 190 degrees C. And the temperature was kept for 20 minutes or more. Thus, the gas was released from sample.

The size of the samples of the example 1 was the length of 0.25 mm, the width of 0.125 mm and the height of 0.125 mm. The size of the samples of the example 2 was the length of 0.6 mm, the width of 0.3 mm and the height of 0.3 mm. The size of the samples of the example 3 was the length of 1.0 mm, the width of 0.5 mm and the height of 0.5 mm. The size of the samples of the example 4 was the length of 1.6 mm, the width of 0.8 mm and the height of 0.8 mm.

Comparative Examples 1 to 4

Necessary additive was added to barium titanate powder and were wet-blended with the resulting barium titanate powder, and were sufficiently crushed by a ball mill. Thus, the dielectric material was obtained. An organic binder and a solvent were added to the dielectric material. A dielectric green sheet was formed by a doctor blade method. Polyvinyl butyral (PVB) or the like was used as the organic binder. Ethyl alcohol, toluene or the like was added as the solvent. In addition, plasticizer or the like was added. Next, the conductive paste for the internal electrode including the powder of the main component metal (Ni) of the internal electrode layer 12, the co-material (barium titanate), the binder (ethyl cellulose), the solvent and the necessary additive was made.

Conductive paste for an internal electrode was screen-printed on the resulting dielectric sheet. Thus, the sheet on which the pattern was formed was made. The sheet on which the pattern was formed was peeled from the base material. And a plurality of the sheets are stacked. Cover sheets including the dielectric material were stacked on a lower face and an upper face of the stacked sheets. After that, a ceramic multilayer structure was obtained by a thermo compression bonding. And the resulting multilayer structure was cut into a predetermined shape.

The resulting ceramic multilayer structure was fired in a temperature range from 1100 degrees C. to 1300 degrees C. in a reductive atmosphere ($O_2$ partial pressure: $10^{-10}$ to $10^{-12}$ atm). And sintered multilayer structure was formed. After that, the conductive paste for the external electrode including the metal filler of which a main component was Cu, the binder, the solvent and so on was coated from the both end faces of the ceramic multilayer structure to the side faces and was dried. Sintering assistant for forming glass may be dispersed in the conductive paste for the external electrode, in order to achieved adherence between the base layer and the ceramic multilayer structure. Next, the conductive paste for the external electrode was fired in nitrogen atmosphere at a temperature lower than the firing temperature for forming the sintered structure (for example, 800 degrees C. to 900 degrees C.). Thereby, the base layer was formed and bonded to the ceramic main body 10. After that, a Ni-plated layer and a Sn-plated layer were formed on the base layer formed by firing the conductive paste for the external electrode. Thus, samples of the multilayer ceramic capacitor were made.

The size of the samples of the comparative example 1 was the length of 0.6 mm, the width of 0.3 mm and the height of 0.3 mm. The size of the samples of the comparative example 2 was the length of 1.0 mm, the width of 0.5 mm and the height of 0.5 mm. The size of the samples of the comparative example 3 was the length of 1.6 mm, the width of 0.8 mm and the height of 0.8 mm. The size of the samples of the comparative example 4 was the length of 2.0 mm, the width of 1.25 mm and the height of 0.6 mm.

(Analysis)

Figure 7:
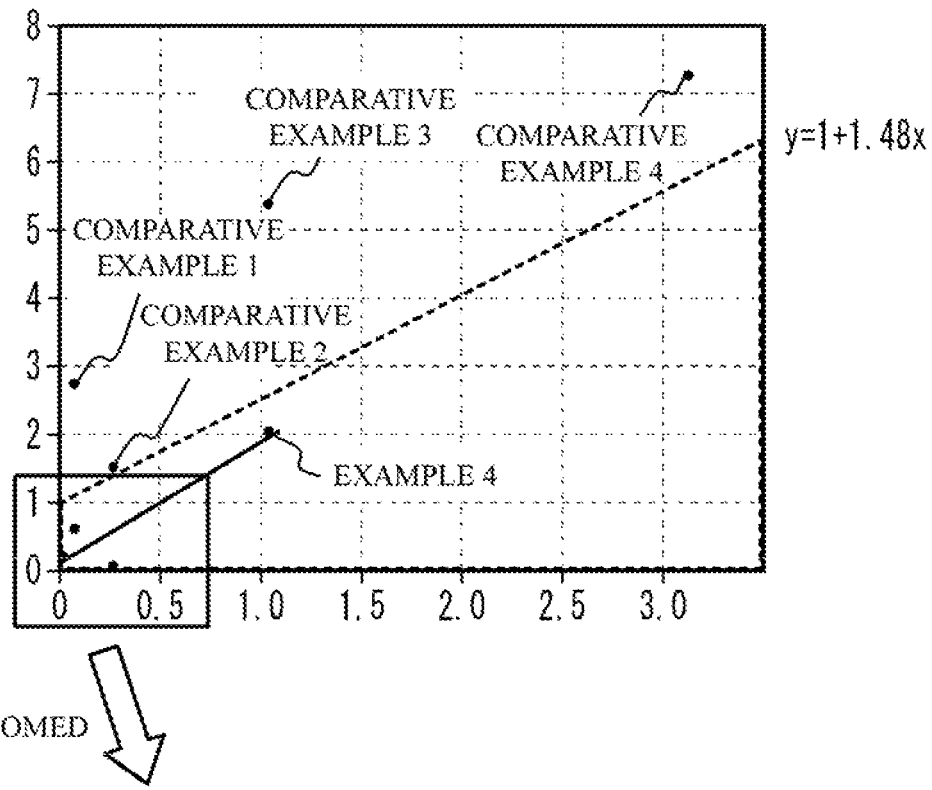
FIG. 7 illustrates a relationship between a volume and a total amount of released gas.
Figure 7:
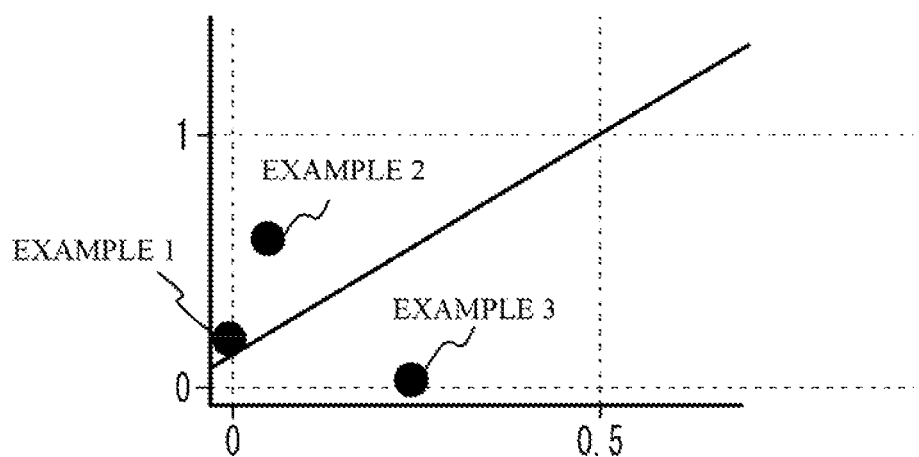

The samples of the examples 1 to 4 and the comparative examples 1 to 4 were heated. And the total amount of the hydrogen gas, the water vapor and the carbonic acid gas released from 190 degrees C. to 260 degrees C. was measured by TDS (Thermal Desorption Spectroscopy). Table 2 shows the results. FIG. 7 illustrates the relationship between volumes of the samples and the amount of the released gas. As shown in Table 2 and FIG. 7, in the examples 1 to 4, the relationship $y \leq 1+1.48x$ was satisfied when the temperature of the samples was increased from 190 degrees C. to 260 degrees C. It is thought that this was because the samples of the examples 1 to 4 were subjected to the pressure reduction and heating process. On the other hand, in the comparative examples 1 to 4, $y > 1+1.48x$ was satisfied when the temperature was increased from 190 degrees C. to 260 degrees C. It is thought that this was because the samples of the comparative examples 1 to 4 were not subjected to the pressure reduction and heating process.

TABLE 2

| | TOTAL AMOUNT OF RELEASED GAS [number of molecules/$10^{15}$] |
|---|---|
| EXAMPLE 1 | 0.1630 |
| EXAMPLE 2 | 0.5933 |
| EXAMPLE 3 | 0.0271 |
| EXAMPLE4 | 2.032 |
| COMPARATIVE EXAMPLE 1 | 2.726 |
| COMPARATIVE EXAMPLE 2 | 1.519 |
| COMPARATIVE EXAMPLE 3 | 5.370 |
| COMPARATIVE EXAMPLE 4 | 7.263 |

Next, other samples of the examples 1 to 4 and the comparative examples 1 to 4 were mounted on substrates through a reflow process. And the solder burst was observed with respect to the examples 1 to 4 and the comparative examples 1 to 4. Table 3 shows the results. As shown in Table 3, the solder burst occurred in the comparative examples 1 to 4. It is thought that this was because $y > 1+1.48x$ was satisfied in the comparative examples 1 to 4, and the amount of the released gas was large in the reflow process. On the other hand, in the examples 1 to 4, the solder burst did not occur. It is thought that this was because $y \leq 1+1.48x$ was satisfied in the examples 1 to 4, and the amount of the released gas during the reflow process was suppressed.

TABLE 3

| | SOLDER BURST | RESULT |
|---|---|---|
| EXAMPLE 1 | 0/100 | OK |
| EXAMPLE 2 | 0/100 | OK |
| EXAMPLE 3 | 0/100 | OK |
| EXAMPLE 4 | 0/100 | OK |
| COMPARATIVE EXAMPLE 1 | 1/100 | NG |
| COMPARATIVE EXAMPLE 2 | 1/100 | NG |
| COMPARATIVE EXAMPLE 3 | 2/100 | NG |
| COMPARATIVE EXAMPLE 4 | 1/100 | NG |

Although the embodiments of the present invention have been described in detail, it is to be understood that the various change, substitutions, and alterations could be made hereto without departing from the spirit and scope of the invention.

What is claimed is:

1. A pre-mounted multilayer ceramic capacitor comprising:
    a ceramic main body having a structure in which each of a plurality of dielectric layers and each of a plurality of internal electrode layers are alternately stacked, a main component of the dielectric layers being ceramic, the ceramic main body having a rectangular parallelepiped shape, the plurality of internal electrode layers being alternately exposed to a first end face and a second end face of the ceramic main body, the first end face being opposite to the second end face;
    a first external electrode that is formed from the first end face to at least one of side faces of the ceramic main body; and
    a second external electrode that is formed from the second end face to at least one of the side faces of the ceramic main body,
    wherein a relationship of $y \leq 1+1.48x$ is satisfied when a temperature of the multilayer ceramic capacitor is increased from 190 degrees C. to 260 degrees C.,
    wherein "y" is a total amount of hydrogen gas, water vapor and carbonic acid gas (number of molecules/$10^{15}$) released from the multilayer ceramic capacitor,
    wherein "x" ($mm^3$) is a volume of the multilayer ceramic capacitor.

2. The pre-mounted multilayer ceramic capacitor as claimed in claim 1, wherein:
    the first external electrode has a first base layer that is mainly composed of a metal or an alloy and is provided directly on the first end face and a first plated layer that is directly provided on the first base layer, and
    the second external electrode has a second base layer that is mainly composed of a metal or an alloy and is provided directly on the second end face and a second plated layer that is directly provided on the second base layer.

3. The pre-mounted multilayer ceramic capacitor as claimed in claim 2, wherein a main component of the first base layer and the second base layer is Ni.

4. The pre-mounted multilayer ceramic capacitor as claimed in claim 2, wherein the first base layer and the second base layer include a glass component, and
    wherein a main component of the first base layer and the second base layer is Cu.

5. The pre-mounted multilayer ceramic capacitor as claimed in claim 1, wherein the total amount is measured by TDS (Thermal Desorption Spectroscopy).

6. The pre-mounted multilayer ceramic capacitor as claimed in claim 2,
    wherein the first plated layer includes one or more plated layers,
    wherein the first external electrode includes a first Sn-plated layer that is directly provided on the first plated layer,
    wherein the second plated layer includes one or more plated layers, and
    wherein the second external electrode includes a second Sn-plated layer that is directly provided on the second plated layer.

7. A manufacturing method of a pre-mounted multilayer ceramic capacitor comprising:
    preparing a multilayer ceramic capacitor having a ceramic main body and a pair of external electrodes, the ceramic main body having a structure in which each of a plurality of dielectric layers and each of a plurality of internal electrode layers are alternately stacked, a main component of the dielectric layers being ceramic, the ceramic main body having a rectangular parallelepiped shape, the plurality of internal electrode layers being alternately exposed to a first end face and a second end face of the ceramic main body, the first end face being opposite to the second end face, wherein a first external electrode that is formed from the first end face to at least one of side faces of the ceramic main body; and
    a second external electrode that is formed from the second end face to at least one of the side faces of the ceramic main body,
    heating the pre-mounted multilayer ceramic capacitor in a reduced pressure atmosphere so that a relationship $y \leq 1+1.48x$ is satisfied when a temperature of the multilayer ceramic capacitor is increased from 190 degrees C. to 260 degrees C.,
    wherein "x" ($mm^3$) is a volume of the multilayer ceramic capacitor,
    wherein "y" is a total amount of hydrogen gas, water vapor and carbonic acid gas (number of molecules/$10^{15}$) released from the multilayer ceramic capacitor.

8. The method as claimed in claim 7, wherein the preparing comprises:
    forming the ceramic multilayer structure having the rectangular parallelepiped shape by alternately stacking ceramic dielectric green sheets and conductive paste for forming the internal electrodes and alternately exposing the conductive paste to the first and second end faces of the ceramic multilayer structure;
    providing conductive paste for forming the first and second external electrodes on the first and second end faces, respectively; and
    firing the ceramic multilayer structure together with the conductive paste for forming the first and second external electrodes.

9. The method as claimed in claim 8, further comprising:
    forming a first plated layer and a second plated layer on a first base layer and a second base layer, respectively, that are formed by the firing of the conductive paste for forming the first and second external electrodes, respectively.

10. The method as claimed in claim 7, wherein the preparing comprises:
    forming the ceramic multilayer structure having the rectangular parallelepiped shape by alternately stacking ceramic dielectric green sheets and conductive paste for forming the internal electrodes and alternately exposing the conductive paste to the first and second end faces of the ceramic multilayer structure;

forming the ceramic main body by firing the ceramic multilayer structure;

providing conductive paste for forming the first and second external electrodes on the first and second end faces, respectively, of the ceramic main body; and firing the conductive paste for forming the first and second external electrodes.

11. The method as claimed in claim 10, further comprising:

forming a first plated layer and a second plated layer on a first base layer and a second base layer, respectively, that are formed by the firing of the conductive paste for forming the first and second external electrodes, respectively.

* * * * *